Oct. 2, 1951   J. D. BUCHANAN   2,569,598
FOUR WAY VALVE
Filed March 25, 1946
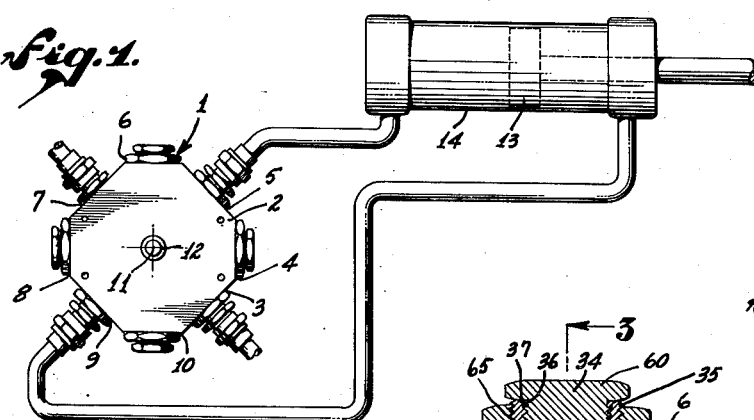
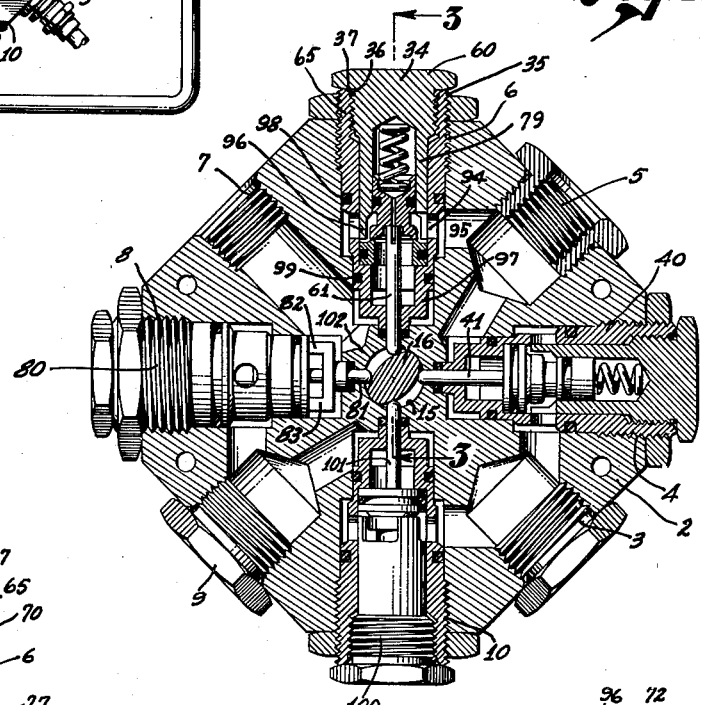
INVENTOR:
J. D. BUCHANAN.
BY
W. E. Bratty
ATTORNEY.

Patented Oct. 2, 1951

2,569,598

UNITED STATES PATENT OFFICE 2,569,598

FOUR-WAY VALVE

J. D. Buchanan, Burbank, Calif.

Application March 25, 1946, Serial No. 656,848

3 Claims. (Cl. 277—20)

The present invention relates to a four way valve for connecting a fluid pressure to either side of the piston of a fluid motor and for connecting the other side of the piston to a return or outlet.

The invention particularly relates to a four way valve for controlling a pressure supply having a high pressure such as three thousand p. s. i., although other high pressures may be used. When a high pressure of that order is employed with a certain type of four way valve having a cam shaft for operating the valve, due to the high pressure leakage, a large force is required to turn the cam shaft.

An object of the present invention is to reduce the force required to operate the cam shaft whereby it may be operated with a low force when employing high pressure fluid supply.

Another feature of the invention relates to simplifying the manufacture of a four way valve. In one respect, this is accomplished by providing a valve cage and seal arrangement which avoids under-cut bores in the valve casing. In another respect this is accomplished by increasing the tolerance required in manufacturing the valve and making the valve adjustable. In a certain type of valve, a close manufacturing tolerance is required in order to properly locate the operating stems of the four valves with respect to an operating cam. This is avoided according to the present invention, by employing a push rod which is free at its outer end from the valve, and by an adjustable connection between each valve and the casing, whereby the closed position of the valve can be adjusted with respect to its push rod, to avoid or reduce lost motion. This adjustment is preferably of such a nature as to maintain a high pressure seal for the operating stems or rods, to permit the cam shaft to be operated with a low force.

For further details of the invention reference may be made to the drawings wherein—

Fig. 1 is a schematic view of a four way valve according to the present invention, connected to a typical fluid motor.

Fig. 2 is an enlarged sectional view of the four way valve of Fig. 1, with the pipes omitted, and the section being taken at right angles to the axis of the cam shaft.

Fig. 3 is an enlarged sectional view with parts broken away on line 3—3 of Fig. 2 looking in the direction of the arrows.

Fig. 4 is a sectional view with parts broken away on line 4—4 of Fig. 3 looking in the direction of the arrows.

Referring in detail to the drawings, the four way valve 1 comprises a casing 2 having eight threaded connections 3—10 inclusive, equally spaced around the axis 11 of a cam shaft 12. The connection 3 is connected to a suitable source of high pressure fluid supply, for example three thousand p. s. i., and diametrically opposite the connection 7 which serves as a return or outlet. The connection 5 at the upper right, and connection 9 at the lower left are connected to the opposite sides of the piston 13 of a suitable fluid motor 14. The remaining four threaded openings 4, 6, 8 and 10 each house a reciprocating valve and all four of the valves are alike, one thereof being shown in Fig. 3. The valves for the openings 4, 6, 8 and 10 are indicated as 40, 60, 80, and 100 respectively. Each valve has an operating stem or rod indicated at 41, 61, 81, and 101 respectively, and the inner ends of these rods project into a cam well 15 having a circular bore and in which is a rotatable cam 16. Cam 16 is elliptical and operates the opposite push rods 61 and 101 at the same time, and when rotated to another position, it operates the opposite push rods 41 and 81.

Referring to Fig. 3, the valve 60 is mounted in a bore 62 in the casing 2, the bore 62 being free from under-cuts. The bore 62 at its outer end is enlarged and inwardly thereof this bore is reduced as shown at 63 to receive the intermediate portion 64 of the outer valve cage 65. The casing bore at its innermost end is further reduced as shown at 66 to receive a resilient ring seal 67 of neoprene or the like, around the push rod 61. The ring seal 67 rests on a shoulder 68 at the inner end of the casing bore and the seal 67 is held in position around push rod 61 by the reduced inner end 69 of the outer cage 65, which slidingly fits in the bore 66. The outer end of cage 65 has threads 70 engaging the threaded opening 6. Cage 65 may be screwed in or out to properly position the inner end of push rod 61 with respect to the cam 16. Cage 65 is held in its lengthwise adjusted position by a lock nut 71. The relative positions of the push rods and valves are adjusted to avoid lost motion at cam 16.

When a cam 16 pushes rod 61 upwardly, valve head 72 is pushed off from its seat 73. The upper end of push rod 61 extends into a recess 74 in valve head 72. Valve head 72 has a piston 75 acted on by spring 76. Piston 75 has a high pressure ring seal 77 and slides in the bore 78 of an inner cage 79 threaded inside of the outer cage 65 as indicated at 91. Piston 75 has an axial bleed passage 92, always in register with a cross slot 93 in the upper end of push rod 61.

Valve head 72 is urged to its seat 73 by spring 76 and by the fluid pressure behind piston 75. Valve head 72 preferably has a flat face as shown, and seat 73 preferably has an apex, giving a tolerance in the concentricity of the valve head and its seat.

As shown in Fig. 4, the intermediate portion of the outer cage is smaller than the bore 62, and provided with a number of ports 94 to admit fluid from an inlet passage 95. The inner cage 79 nests in and is surrounded by the outer cage 65. The lower end of the inner cage 79 has three legs 96 spaced apart and here shown as different in number from the four ports 94 to always provide a fluid passage to the top of valve head 72 regardless of their relative angular positions.

The inner end 69 of the outer cage 65 serves as a slide bearing for push rod 61. The inner end 69 is carried by two legs such as 97, spaced apart and communicating with the outlet connection 7. Legs such as 97 are also shown, perhaps clearer, at 82, 83 for valve 80 in Fig. 2.

As shown in Figs. 2 and 3, the outer cage 65 has high pressure seals 98, 99 in grooves in its periphery on opposite sides of the inlet passage 95.

Seat 73 has a tubular body 31 which fits in the bore of the outer cage 65 and is supported on the shoulder 32. Body 31 has a high pressure ring seal 33.

The lower ends of the three cage legs 96 retain seat 73 in position. While the legs 96 as shown as having a clearance above seat 73, this clearance may be small and of the order of one tenth mil.

To prevent leakage along threads 91 between the outer cage 65 and the inner cage 79, the inner cage 79 may be provided with a head 34 which acts like a valve head in fitting on a tapered seat 35 on the outer end of the outer cage 65, the stem of head 34 being spaced from the interior of seat 35 as shown at 36 in Fig. 2, and having a high pressure ring seal 37.

Each push rod like 61 has a high pressure seal like 67. Hence whatever leakage reaches the cam well 15 from the push rods appears as low pressure which exerts only a low force in binding or distorting the ring seals on the cam shaft 12. Such seals are shown at 38 and 39 in Fig. 3 on opposite sides of all the push rods like 61 and at the opposite ends of the cam 16. The seals 38, 39 are low pressure seals. A low pressure in the cam well 15 is also assured by a bleed passage 102, see Fig. 2, which leads from cam well 15 to the return connection 7.

The leakage from all the push rods like 61 bleeds through passage 102 to the return 7, whereby shaft 12 may be operated with a small force when operating with high pressure fluid.

From Fig. 2 it is apparent that the casing 2 has passages whereby the high pressure inlet 3 is connected to the inlet side of valves 40 and 100; the outlet side of valves 60 and 80 lead to the return 7; fluid motor connection 5 connects with the outlet side of valve 40 and with the inlet side of valve 60; and fluid motor connection 9 connects with the outlet side of valve 100 and with the inlet side of valve 80.

Connection 9 is an inlet and 5 and outlet when cam 16 is rotated counterclockwise 45 degrees from the position shown in Fig. 2. The flow is reversed when cam 16 is rotated clockwise 45 degrees from the position shown in Fig. 2.

As shown, the casing 2 may be one block, of uniform thickness. The push rods radiate from a common center on axis 11 and they are in a plane at right angles to axis 11.

From the above description it will be apparent that close tolerances are avoided in the manufacturing, regarding the placement of the inner ends of the push rods with respect to the cam, that such placement can be obtained in the course of assembly, and that high fluid pressure does not reach the cam seals.

The push rod operated valve is an improvement over the valve described and claimed in copending application S. N. 639,756 filed Jan. 8, 1946, now Patent No. 2,490,944, dated December 13, 1944 for "Reciprocating Valve" which claims some of the valve features here shown, while a method of making such valves is described and claimed in a division of application S. N. 639,756, namely S. N. 779,631 filed October 13, 1947, for "Method of Making Reciprocating Valves," now abandoned.

It will be apparent that various modifications may be made in the invention without departing from the spirit of the following claims.

I claim:

1. A four way valve comprising a casing having a radial array of four reciprocating valves with supply, return, and fluid motor connections controlled thereby, said valves each having an operating push rod each operable to open its valve and said four push rods radiating from a common center, said casing having a central cam well having a wall, a high pressure seal in said wall around each of said push rods, a cam in said well in operative relation to said rods for operating said valves two at a time, a high pressure inlet passage communicating with two of said valves independently of said cam well, the high pressure seals for said last mentioned two valves being exposed to pressure in said high pressure inlet passage, a return passage communicating with the other two of said valves independently of said cam well, the high pressure seals for said other two valves being exposed to pressure in said return passage, a bleed passage in said wall leading from said cam well to said return for bleeding leakage flowing through said high pressure seals into said cam well, and a low pressure seal on said cam at opposite ends of said cam well.

2. A four way valve comprising a casing having a radial array of four reciprocating valves with supply, return, and fluid motor connections controlled thereby, each of said valves having an inner cage and an outer cage arranged in a bore in said casing and each of said bores having an outer first bore of a first size and inwardly thereof a second bore of a smaller size, and inwardly thereof a third bore of a still smaller size, and inwardly thereof a fourth bore of a still smaller size, a push rod slidable in each of said fourth bores and having a ring seal in each of said third bores and each of said outer cages fitting in one of said first and second bores and having an extension fitting in one of said third bores on its ring seal, each of said push rods being slidable in its said outer cage extension, each of said valves having a valve seat removably fitting in its outer cage and held therein by its said inner cage, each of said valves having a valve head having a piston slidable in its inner cage and a spring in each of said inner cages for urging its valve head to closed position, each of said push rods loosely engaging its associated valve head, means removably connecting said inner cages to said outer cages respectively and means for longitudinally adjusting each of said outer cages in its said first bore, a cam well having a wall in which said fourth bores are arranged, and a cam in said well for operating said push rods.

3. A four way valve according to claim 2, said casing having a separate port communicating with the side of each of said first bores adjacent the inner end thereof, each of said outer cages being reduced in diameter opposite its said port and having a port therethrough with a communicating port through the inner cage to one side of said valve and said piston, each of said outer cages having a reduced intermediate portion fitting in its said casing bore of second size and having a ring seal therein and said outer cage having a ring seal in said bore of first size, and a ring seal on each of said seats for sealing the flow between the exterior of each seat and the interior of its said outer cage.

J. D. BUCHANAN.

REFERENCES CITED

The following references are of record in the file of this patent:

UNITED STATES PATENTS

| Number | Name | Date |
| --- | --- | --- |
| 970,348 | Osborne | Sept. 13, 1910 |
| 1,877,763 | Hazard | Sept. 20, 1932 |
| 2,294,702 | Van Der Werff | Sept. 1, 1942 |
| 2,299,719 | Frimel | Oct. 20, 1942 |
| 2,323,947 | Van Der Werff | July 13, 1943 |
| 2,338,101 | Ellinwood | Jan. 4, 1944 |
| 2,387,007 | Buchanan | Oct. 16, 1945 |
| 2,397,299 | Strid | Mar. 26, 1946 |
| 2,496,849 | Bertea | Feb. 7, 1950 |